United States Patent [19]

Meister

[11] Patent Number: 4,684,262

[45] Date of Patent: Aug. 4, 1987

[54] ELECTRONIC TIMEPIECE WITH ANALOG DISPLAY COMPRISING A SECONDS INDICATOR MEMBER

[75] Inventor: Pierre-André Meister, Bienne, Switzerland

[73] Assignee: Eta S.A. Fabriques d'Ebauches, Granges, Switzerland

[21] Appl. No.: 905,224

[22] Filed: Sep. 9, 1986

[30] Foreign Application Priority Data

Sep. 11, 1985 [CH] Switzerland .......................... 920/85

[51] Int. Cl.$^4$ ..................... G04F 5/00; H02K 29/04
[52] U.S. Cl. .................................... 368/157; 368/160; 368/187; 318/696
[58] Field of Search .................. 368/76, 80, 157, 160, 368/187; 310/40 R, 40 MM; 318/696

[56] References Cited

U.S. PATENT DOCUMENTS

| | | | |
|---|---|---|---|
| 3,958,167 | 5/1976 | Nakajima et al. | 318/696 |
| 4,371,821 | 2/1983 | Laesser et al. | 318/696 |
| 4,433,918 | 2/1984 | Nishimura et al. | 368/74 |
| 4,440,502 | 4/1984 | Kanno | 368/80 |
| 4,471,284 | 9/1984 | Guerin | 318/696 |
| 4,514,676 | 4/1985 | Grandjean et al. | 318/696 |

FOREIGN PATENT DOCUMENTS

| | | |
|---|---|---|
| 0087387 | 2/1983 | European Pat. Off. |
| 2209251 | 12/1973 | France. |
| 2087601 | 7/1981 | United Kingdom. |
| 2110846 | 10/1982 | United Kingdom. |

OTHER PUBLICATIONS

Bulletin Annuel de la Societe Suisse de Chronometrie, vol. 11, No. 1, 1982, pp. 147–151, Neuchatel, CH: R., Grandjean: "Moteurs Biphase pour Montre a Quartz"-*Figures*.
Elektronik, vol. 29, No. 26, Dec. 1980, pp. 43–46, Munich, DE; H. Grugg et al.: "Schrittmotoren Optimal Angesteuert", p. 44, paragraphs 2,3; Figures*.
Elektronik, vol. 33, No. 1, Jan. 1983, pp. 37–39, Munich, DE, T. Wittchen: "Minischritt-Steuerung fur 2--Phasenschrittmotoren mit Geschalteten Stromreglern".

Primary Examiner—Vit W. Miska
Attorney, Agent, or Firm—Pollock, Vande Sande & Priddy

[57] ABSTRACT

The timepiece comprises a first motor for driving a second hand and a second motor for driving minute and hour hands.

When the timepiece is operating normally, the first motor, which comprises at least two coils, is controlled continuously by variable voltages in such a way that its rotor is subjected to a rotating magnetic field and that the second hand moves forward by effecting at least five jumps per second. Furthermore, these voltages are preferably such that the rotor effects one revolution per minute, it therefore being possible to fix the second hand directly to the rotor shaft.

The second motor is a conventional, preferably bidirectional stepping motor.

9 Claims, 8 Drawing Figures

ELECTRONIC TIMEPIECE WITH ANALOG DISPLAY COMPRISING A SECONDS INDICATOR MEMBER

FIELD OF THE INVENTION

The present invention relates to electronic timepieces, especially watches, which have analog display and are equipped with an indicator member for displaying the seconds.

More precisely, the invention relates to timepieces of this type which comprise at least two motors for actuating the different display members, one of these motors serving to drive the seconds indicator member, either on its own or with other members.

DESCRIPTION OF THE PRIOR ART

Watches are currently known in which a stepping motor actuates a second hand and a minute hand while another drives an hour hand and a date indicator. Such an arrangement allows a watch with a second hand to be fitted with an electronic correction system, which has not previously been possible with a single motor. Moreover a rapid change of the time zone is possible, without the risk of losing the correct time, and the incorporation into the watch of a chronographic function is easy.

This arrangement has one other great advantage: the energy consumption is considerably lower than it would be if the watch had only one motor supplied with drive pulses of fixed duration. In fact, the motor which only drives hands and which is consequently only subjected to a low load can be supplied with low energy drive pulses. In contrast, a motor which actuates the calendar mechanism needs pulses of considerably higher energy, but much fewer in number, for example a dozen per hour. This therefore allows the life of the battery to be increased to a great extent or for its size to be reduced without the need for systems for adapting the energy from the drive pulses to the load of the motors, such as exist currently and require relatively complicated circuits.

In other known watches, a first stepping motor drives the second, minute and hour hands while a second causes a date disk to move forward. This arrangement exhibits the same advantage as the above arrangement as far as energy consumption is concerned. Furthermore, it is easy in this case to program the control circuit of the second motor so as to create a perpetual or partially perpetual calendar.

Finally, it is known to resort to two stepping motors to drive, on the one hand, a second hand and, on the other hand, minute and hour hands. Like the first, this third arrangement allows the watch to be provided with an electronic correction system and the functions which it can fulfil to be multiplied without the number of indicator members being increased. In fact, as the minute and hour hands can be moved rapidly, it is possible to use them to display, on command, things other than the current time, for example, a memorized alarm time or a date. As for the second hand, that can serve to indicate by a particular movement that which the other two hands are displaying at a given moment.

Moreover, the reliability of the watch is improved by the fact that a breakdown in the operation of the seconds motor does not cause the minute and hour hands to stop and if the motor used for these latter also drives a calendar mechanism yet more energy is saved in relation to a watch with just one motor.

SUMMARY OF THE INVENTION

The aim of the present invention is to effect in watches and more generally timepieces having a seconds indicator member and which are provided with at least two motors an improvement which makes the use of these two motors even more advantageous than it is at present, said improvement being applicable generally to the various kinds of known watch described above.

A timepiece according to the invention comprising an oscillator, a frequency divider connected to this oscillator, a first indicator member for displaying the seconds and a second indicator member for displaying other time information. A first motor comprises a rotor with a permanent magnet carried by a shaft drivingly coupled to the first indicator member and a first control circuit is connected to the frequency divider to control the first motor. A second motor functions step-by-step in response to voltage drive pulses so as to drive the second indicator member, and a second control circuit is also connected to the divider to produce these drive pulses. A correcting device allows the timepiece to be changed from a normal functioning mode to a correction mode and vice versa and effects modification of at least the time information displayed by the second indicator member when the timepiece is in the correction mode. In accordance with the invention, the first motor comprises at least two coils and the first control circuit applies continuously to these coils variable voltages which subject the rotor of this motor to a rotating magnetic field such that the first indication member moves forward by at least five jumps per second so long as the timepiece is in the normal functioning mode.

The time information displayed by the second indicator member can be the minutes, hours or date.

If it is the minutes or hours, the timepiece according to the invention is also equipped with a third indicator member for displaying respectively the hours or minutes and which is preferably driven, in the first case, by the second motor and, in the second case, by the first motor but which may equally well be actuated by a third motor of the stepping type, like the second.

If it is the date, the timepiece additionally comprises third and fourth indicator members for displaying the minutes and hours and which may be driven either by the first motor or by an additional stepping motor, or indeed even by two.

To say that the first motor is continuously supplied with voltages which allow its rotor to be subjected to a rotating magnetic field implies, firstly, that it is possible at any time to impose on this rotor the desired position by giving to the voltages which are applied to the motor the values which correspond to this position, secondly, that if for any reason, for example an impact, an external magnetic field or even a momentary locking of the mechanism which it drives, it does not rotate or does not move into the right position or even moves away from the position in which it should remain, it will recover its correct position by itself when the cause of this disturbance disappears and, thirdly, that it is also possible to force it to make any number of steps per revolution at the desired speed. In theory it would be possible, without going beyond the scope of the invention, to make the number of steps per revolution infinite, that is to make the motor and, consequently, the second hand rotate perfectly continuously. The problem is that it would then be necessary to connect to it an at least partially analog control circuit and it is at present very difficult, not to say impossible, to use this type of circuit in a watch. Moreover, as will be seen below, there can only be any advantage in increasing the number of steps per revolution of the motor up to a certain point, beyond which it becomes practically pointless. Furthermore, this increase in the number of steps per revolution is not the only way of increasing the number of jumps effected per minute by the second hand, which number does not in fact, have any reason to be very large. This is advantageous because, as will be seen below, an increase in the number of steps per revolution of the motor makes its control circuit more complicated, not in principle but because a higher and rapid-growing number of elementary circuits (flip-flop circuits, gates etc.) is needed to make it up.

Furthermore, for the rotor of a motor to be subjected to a rotating magnetic field it suffices for this motor to comprise two coils and, preferably, a stator, which allow two component fields to be created having different, for example perpendicular, directions. These two fields do not themselves have to be rotating but merely to be capable of changing direction. The rotation of the resultant field is thus obtained by making their amplitudes vary appropriately by means of voltages applied to the coils.

The bidirectional motor constituting the subject matter of U.S. Pat. No. 4,371,821 corresponds to this definition and as, moreover, it is simple, compact and thoroughly perfected since it is already used in certain watches, it is highly advantageous to use it as the first motor in a timepiece according to the invention, with one reservation, however.

In most of the embodiments which it was given by way of example in the Patent in question and which are currently found in watches, the motor has a stator which is adapted so as to intensify the $\pi$-periodic positioning torque to which its rotor is subjected simply because this stator comprises three poles while the permanent rotor magnet only has two. In other words, the motor comprises additional positioning means which ensure that the rotor of the motor has two opposite rest positions which are sufficiently stable and precise for the motor to function reliably and efficiently, which could not otherwise be guaranteed, at least in the case of a timepiece such as a watch or alarm clock.

On the other hand, because of the existence of these means it is necessary to supply more energy to the motor so that its rotor can overcome the positioning torque acting on it. Thus, when the motor is controlled normally to cause the rotor to effect 180° steps, a good proportion of the energy of the drive pulses which it receives are used purely therefore and it is thus not possible to immobilize the rotor between its rest positions. Furthermore, from the moment when the rotor has turned 90°, the positioning torque becomes a drive torque and helps it complete its step.

If the rotor of this same motor were to turn by small steps, for example of 1°, it would not only have to overcome the positioning torque in order to move but also to remain in position between two successive steps, and this would be the case in all its positions except possibly its rest positions and the other two positions in which the torque would be zero. The energy consumption of the motor would consequently be far greater than when it functions in the manner for which it was designed.

What it is necessary to do, therefore, is to use the motor of the above Patent without additional positioning means. In fact, once it has been decided to control the motor in a way which allows the position of its rotor to be controlled at will, these means are no longer necessary. If it is wished to bring this rotor into a precise position which would normally be a rest position and to hold it there, it is sufficient to apply to the coils of the motor voltages which correspond to this position. According to what has been said above, it is clear that the rotor will then remain subjected to a positioning torque, but this latter will be sufficiently weak for it not to be justified to provide means which, this time, would allow the positioning torque to be reduced as much as possible and even to be eliminated.

The new advantages which, thanks to the invention, are exhibited by the watches with two or more motors which have already been discussed or by other timepieces of the same type are numerous.

First of all their wheel-work can often be simplified. So long as it is not required that the second hand make a very large number of jumps per minute, it is possible to control the first motor so that its rotor effects exactly one revolution per minute and to position it inside the timepiece in such a way as to be able to fix the second hand directly on the shaft of this rotor, whether or not this hand is at the centre of the dial. This allows the second wheel and the intermediate wheel which would be necessary if the motor was a stepping motor operating in the traditional manner to be dispensed with. Thanks to this simplification the wheel-work takes up less space and is cheaper. Furthermore, the forces of friction and inertia which the motor must overcome are diminished and even virtually eliminated where it only drives a second hand. It thus consumes less energy.

Moreover, if at present one wishes to offer to the user of an electronic, analog display watch the possibility of putting the second hand to zero when he wishes, for example in order to put the watch to exactly the right time, to the second, or because the watch comprises a chronographic function, it is necessary to provide a mechanism, for example a heart mechanism, or detection means which allow the electronic circuit either to know where the hand is at the moment when the return to the zero position is ordered or to be able to stop it when it passes through that position. Thanks to the invention, the problem can be solved in a much simpler way, by intervening solely at the level of the integrated circuit of the watch. This is true above all when the rotor of the first motor effects one revolution per minute, as, in this case, it suffices to apply to the coils of the first motor the voltages which correspond to the zero position of the second hand in response to a signal produced by a manual control member, this being no more complicated than resetting to zero a seconds counter in a watch with digital display.

Furthermore, as has already been said, if the functioning of the first motor is momentarily disturbed its rotor automatically resumes its correct position. Thus, if this rotor effects one revolution per minute and if it only drives the second hand there is no risk of losing the correct time for that reason. If it simultaneously drives the minute hand, this risk is no longer eliminated but merely diminished since in order for the correct time not to be lost it is necessary for the disturbance to last less than one minute and for the rotor to recover its position by rotating in the right direction.

To this there should be added the advantages resulting from the fact that it is possible to make the rotor of the first motor effect any desired number of steps per revolution, these advantages being as follows.

Firstly, in conventional electronic watches the second hand, which makes one jump every second, advances in a jerky manner which is less pleasant to look at than the quasi-continuous rotation of the second hand in mechanical watches and which makes it less easy to note at first glance whether the watch is working correctly or not. In a watch according to the invention, by making the second hand advance at a rate of five jumps per second, the movement of the second hand of most mechanical watches is reproduced, and it is easy to raise the number of jumps, for example to sixteen or thirty-two to give the impression that the hand moves forward in a truly continuous manner. To go beyond that would be pointless as the user would no longer be able to see the difference.

Secondly, when the conventional watches in question can also be used as chronographs, the times measured can only be known to the second, with there being each time the possibility of an error of more or less one unit, which is a handicap in relation to mechanical chronographic watches whose precision is generally to a fifth of a second. Thanks to the invention, not only can this handicap be easily overcome by making the second hand effect five jumps per second but it is also possible, by opting for 10 jumps or more instead of five, to reach a tenth of a second, which is the limit imposed by the number of graduations which a watch dial can carry.

Thirdly and finally, the stepping motors which are currently used in the manufacture of watches are motors whose rotor rotates by steps of 180°. The rotation of the rotor during each of these steps is very fast and can be likened to an impact. This impact causes mechanical vibrations in the various watch elements which vibrations uselessly waste part of the electrical energy supplied to the motor, and in a watch with a second hand this occurs 60 times a minute. This disadvantage was slightly mitigated in the case of motors with hexapolar magnets, which have also been used in watches but which are no longer used therein for reasons of bulk and difficulty of manufacture. In a watch according to the invention, it can be mitigated to a far greater degree as it is obvious that if the rotor of the first motor is made to effect steps of 1.2° or even of several degrees the impact phenomenon is eliminated for this motor and remains only for the other, which most of the time have only to make one or two steps per minute, per hour or per day when the watch is functioning normally.

If stock is taken of the energy which can be saved by using as first motor a stepping motor without positioning means for its rotor, by making this rotor rotate by sufficiently small steps and by making it drive the second band directly, it will be noted that, even without necessarily using all these possibilities at once, it is possible to arrive at the point where, although it is normally supplied continuously, this motor consumes no more than a traditional stepping motor driven every second by current pulses. It is even possible, provided that the other motor or motors is or are chosen and made to function correctly, to effect an overall energy saving in comparison with a watch which only comprises stepping motors supplied in the conventional manner. When this is in fact the case, the whole or part of this saving can serve to increase the reliability of functioning of the motor or motors which drive the indicator members other than the second hand, for example by reinforcing the positioning torque to which the rotor of the motor or motors in question is subjected or by supplying this motor or motors with pulses of longer duration than those usually provided.

BRIEF DESCRIPTION OF THE DRAWINGS

The invention will be better understood from a reading of the following description of two possible embodiments, selected by way of example. This description will be made with reference to the attached drawings, in which.

DESCRIPTION OF THE PREFERRED EMBODIMENTS

Figure 1:
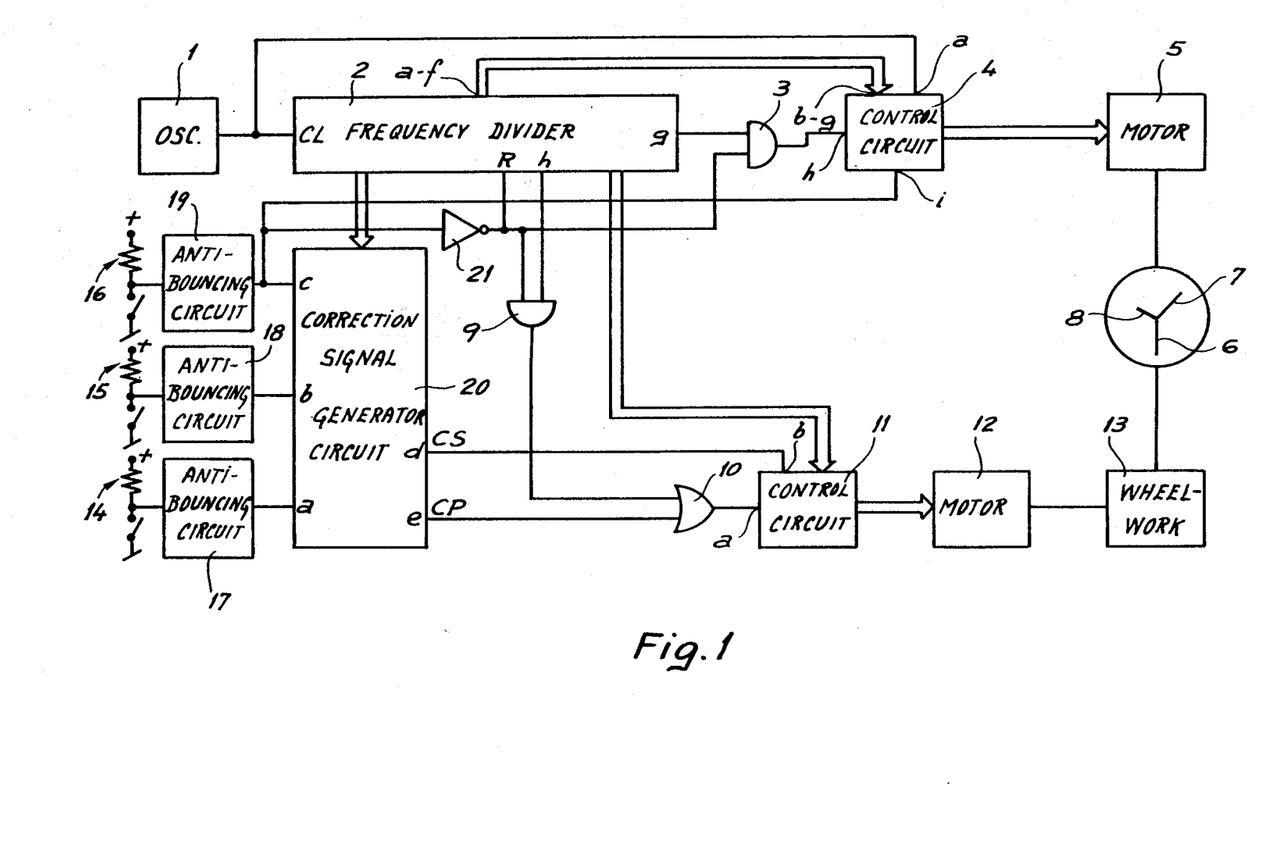
FIG. 1 is a block diagram of an electronic watch according to the invention with two motors, in which the first motor only drives a second hand.

The watch shown in FIG. 1 comprises a quartz oscillator 1 for producing a signal at a standard frequency of 32 768 Hz. This signal is applied to the input CL of a frequency divider 2 designed to provide all the periodic signals which the other parts of the watch circuit need to fulfil their functions.

This frequency divider has, in particular, six outputs a to f where signals appear at frequencies of, respectively, 16 384 Hz, 8 192 Hz, 4 096 Hz, 2 048 Hz, 1 024 Hz and 512 Hz, and two others g and h through which it delivers, respectively, a signal of 5 Hz and time pulses of 1/12 Hz. It also comprises an input R which allows all its outputs to be reset to zero when the logic level of a signal applied to this input goes, for example, from "0" to "1".

The output g of the divider is connected through the intermediary of an AND-gate 3 to an input h of the control circuit 4 of a motor 5 designed to drive directly, that is to say without intermediate wheel-work, a second hand 6 which, when the watch is functioning normally, moves forward at a rate of five jumps per second.

Furthermore, the circuit 4 receives directly, through another input a, the output signal of the oscillator 1, through six others b to g the signals which the frequency divider 2 supplies to its outputs a to f and, finally, through a last one i a signal whose origin and use will be indicated below.

Figure 2:
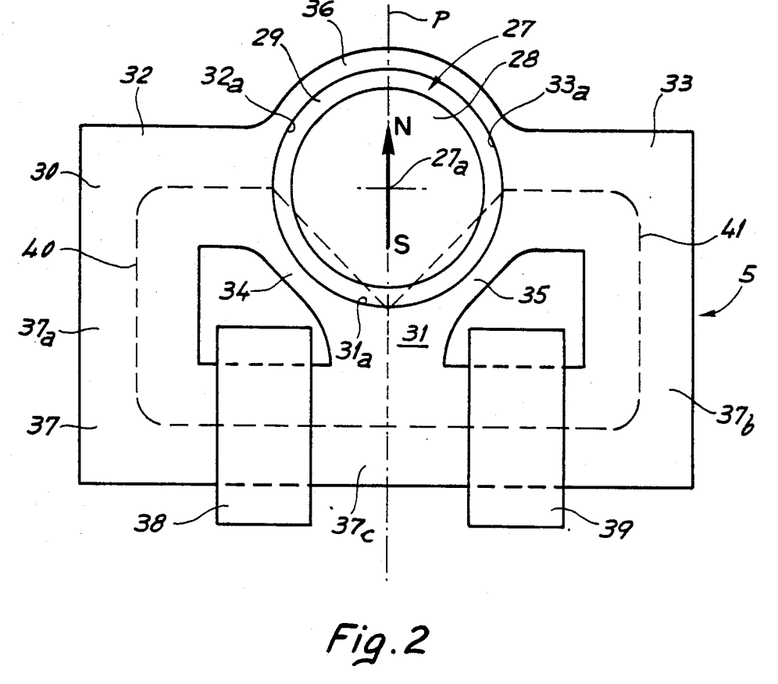
FIG. 2 is a diagrammatic view of this first motor.

FIG. 2 shows diagrammatically how the motor 5 is constructed.

It comprises a rotor 27 whose shaft, which is not visible in the Figure, carries the second hand of the watch and a bipolar permanent magnet 28 in the form of a cylinder and magnetized diametrically.

This magnet, whose axis coincides with the axis of rotation $27_a$ of the rotor is located at the centre of a cylindrical opening 29 provided in a stator 30.

The stator 30 has three pole parts 31, 32 and 33 of weak magnetic reluctance which each have a pole face, numbered $31_a$, $32_a$ and $33_a$ respectively, facing the magnet 28 and which are arranged so that two of them, those which are designated with the reference numerals 32 and 33, are symmetrical with respect to a plane P which constitutes the median plane of the third and which, naturally, contains the axis of rotation $27_a$ of the rotor.

These three pole parts are connected together, on their pole face side, by three narrow parts or isthmuses 34, 35, 36 of high reluctance which finish defining the opening 29 and, on the opposite side from this face, by a low reluctance part 37 in the form of a U whose two lateral branches $37_a$ and $37_b$ are connected respectively to the pole parts 32 and 33 and whose base $37_c$ is connected to the pole part 31.

Finally, the motor 5 also comprises two coils 38 and 39 which are positioned around the part 37 of the stator, on each side of the pole part 31, and which are connected to the control circuit of the motor.

It is obvious that in practice the stator 30 will not consist of one but generally of two pieces one of which will carry the coils and the other of which will form the pole parts and isthmuses, these two pieces being assembled by appropriate means, for example screws.

Moreover, if the motor which has just been described is compared briefly with that which forms the subject matter of U.S. Pat. No. 4,371,821, it will be noted that it is clearly the same and that it effectively corresponds to the case where no additional positioning means are provided for the rotor since the opening 29 in which the magnet of the rotor is located is truly cylindrical.

In a general way, when a voltage is applied to the coil 38, this coil produces a magnetic field $B_1$, whose lines of force are represented by the dashed line 40. The lines of force pass through the half of the part 37 of the stator where the coil 38 is situated and through the pole part 32, cross the opening 29 between the pole faces $32_a$ and $31_a$ and close up across the pole part 31.

Similarly, when another voltage is applied to the coil 39 this coil produces a second magnetic field $B_2$ whose lines of force are represented by the line 41, also dashed. These lines of force, which are symmetrical with the above lines of force 40 in relation to the plane P, pass through the other half of the part 37 and the pole part 33, cross the opening 29 between the pole faces $33_a$ and $31_a$ and close up across the pole part 31.

Of course, the sense and strength of these fields $B_1$ and $B_2$ depend respectively on the sense and value of the voltages applied to the coils.

Figure 3:
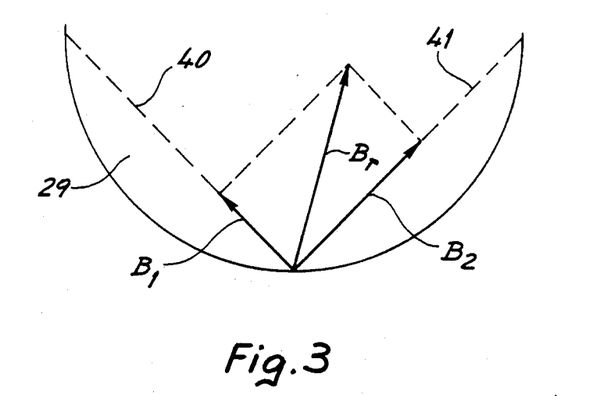
FIG. 3 shows diagrammatically the magnetic fields acting on the magnet belonging to the rotor of this motor.

FIG. 3 shows diagrammatically these two fields in the opening 29, with arbitrarily selected sense and intensity, and the resultant field $B_r$.

When this field $B_r$ is in fact created the rotor is subjected to a drive torque which causes it to turn and to place itself, via the shortest path, in the position in which the axis of magnetization N-S of the magnet 28 has the same direction and the same sense as the field, obviously providing that the rotor is not already in this position and that the drive torque in question is greater than the resistant torque resulting in particular from the load which the rotor has to drive, from the friction of its shaft against the bearings between which it is mounted and from the weak positioning torque which, as has already been indicated, stems from the fact that the magnet 28 is bipolar while the stator 30 has three pole parts.

If the field $B_r$ exists and suddenly changes direction the rotor reacts in the same way. On the other hand, if the field turns in one sense or the other, it draws the rotor with it.

This confirms what has already been said, that is that by applying the necessary voltages to the coils, the rotor can be made to do whatever is required. It can equally well be caused to occupy successively different positions at a smaller or greater distance from each other according to a predetermined program, as to rotate in one sense or the other continuously or not and at whatever speed is desired. Even the useful torque supplied by the motor can be varied at will in one revolution or from one revolution to the other by modifying the strength of the field $B_r$, but this is clearly not justified when the rotor only drives one or more watch hands.

In the case of the watch of FIG. 1, it is sufficient, normally, for the rotor to turn in the sense which allows the second hand to move forward at a rate of 300 steps of 1.2° per minute and a constant speed and for it to place itself on command in the position corresponding to the zero position of the hand.

If the rotor were to rotate continuously at the same speed, it would be necessary for the fields $B_1$ and $B_2$ to vary sinusoidally as a function of the time and in obedience to the relationships:

$$B_1 = |CR| \sin \omega t$$
and
$$B_2 = |CR| \cos(\omega t + \phi)$$

where $|CR|$ is the constant strength of the resultant field CR, $\omega$ is equal to $2\pi/60$ and $\phi$ is an angle of phase difference which depends on the angle formed by the directions of the fields $B_1$ and $B_2$ in the opening of the stator.

As the magnetic fields $B_1$ and $B_2$ are proportional to the currents which circulate in the coils 38 and 39 respectively and, consequently, to the voltages applied thereto, these voltages should then be given by the relationships:

$$V'_1 = V_o \sin \omega t$$

and $$V'_2 = V_o \cos(\omega t + \phi)$$

Figure 4:
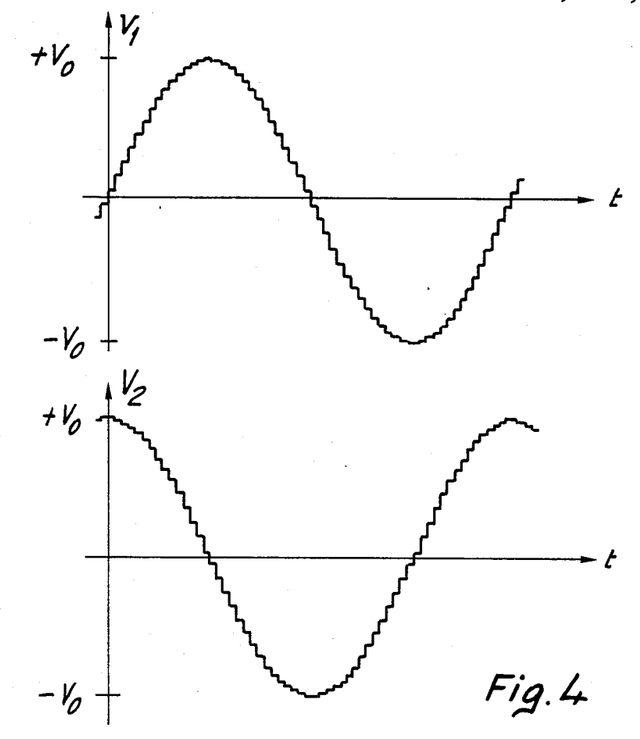
FIG. 4 shows the forms of the voltages which are applied to the coils of this motor when the watch is functioning normally.

In fact, given that the rotor must move forward in steps, the voltages which have to be applied to the coils are not these sinusoidal voltages but quasi-sinusoidal voltages $V_1$ and $V_2$ which correspond thereto, that is to say voltages which vary by successive stages in the manner of those shown in FIG. 4, following very closely the variations which would be those of the voltages $V'_1$ and $V'_2$.

Moreover, when the motor of U.S. Pat. No. 4,371,821 is designed to function normally in steps of 180° the angle between the directions of the fields $B_1$ and $B_2$ can be comprised largely between 60° and 120° but it is preferably equal to 90° as that makes possible, in particular, a resultant field of the same strength whether it is located in the plane corresponding to the plane P in the Figure or whether it is perpendicular to this plane. In the present instance, the fact of opting for this value has as advantage the simplification notably of the control circuit of the motor, as the angle $\phi$ in the expression of the field $B_2$ and the voltage $V'_2$ is then equal to zero. The curves in FIG. 4 correspond in fact to this situation.

On the other hand, it is obvious that these curves are not correct as far as the number of stages shown for each of the voltages $V_1$ and $V_2$ is concerned. There are only fifteen for each quarter of a period when, theoretically, if it was desired to control the motor in such a way that the rotor made 300 steps per minute by applying to the coils voltages as close as possible to truly sinusoidal voltages, 75 would be required. As will be seen below, fewer can be provided so as here too to simplify the control circuit, without the visible movement of the second hand showing the effects thereof, but in spite of this it would be virtually impossible to show the two curves on a single page with all their stages clearly marked.

Figure 5:
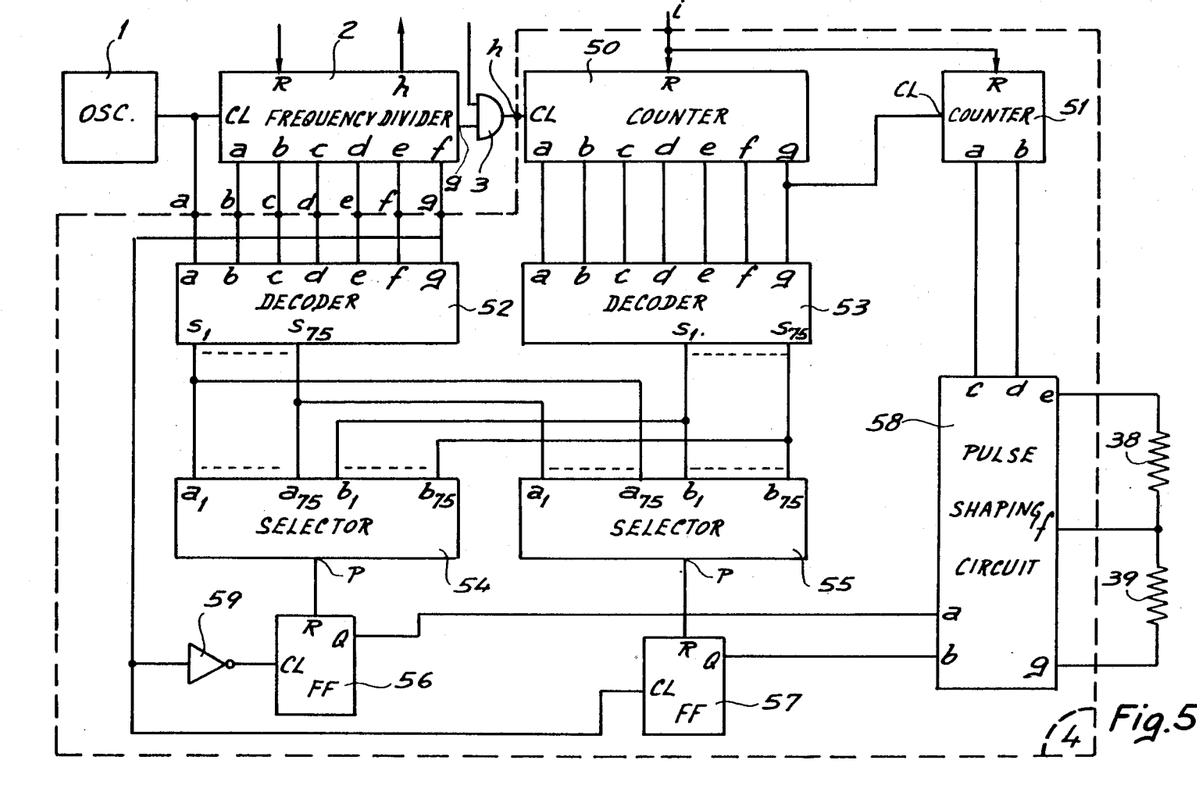
FIG. 5 is a block diagram of the control circuit of this motor.

FIG. 5 shows a possible embodiment of the control circuit 4 of the motor, which embodiment is capable of supplying the motor with the quasi-sinusoidal voltages $V_1$ and $V_2$ which it needs if the directions of the fields $B_1$ and $B_2$ effectively form between them an angle of 90°.

Also in this Figure, there are shown the coils 38 and 39 of the motor and, for a reason which will be understood below, the oscillator 1, the frequency divider 2 and the AND-gate 3 of FIG. 1.

In this embodiment the control circuit 4 comprises two counters 50 and 51, two decoders 52 and 53, two selector circuits 54 and 55, two T-type flip-flops 56 and 57 and a pulse-shaping circuit 58 which supplies the coils 38 and 39 of the motor.

The counter 50, whose counting capacity is equal to the number of steps which the rotor has to make in fifteen seconds, that is to say 75, has a counting input CL and a reset input R connected respectively to the inputs h and i of the circuit. The input CL can thus receive, through the intermediary of the AND-gate 3, the signal at 5 Hz originating from the output g of the frequency divider 2. This counter has, moreover, seven outputs a to g which are each connected, in order, to the seven inputs a to g of the decoder 53.

The counter 51, which itself has a counting capacity of four, has a counting input CL connected to the output of greatest weight g of the counter 50, a reset input R also connected to the input i of the circuit and two outputs connected to two inputs c and d of the pulse-shaping circuit 58.

The decoder 52 also has seven inputs a to g which are connected to the inputs a to g of the circuit and, consequently, one to the output of the oscillator 1 and the others to the outputs a to f of the divider 2.

The two decoders 52 and 53 each have 75 outputs $s_1$ to $s_{75}$ which are connected both to the selector 54 and to the selector 55. More precisely, those of the decoder 52 are connected to 75 inputs $a_1$ to $a_{75}$ of the selector 54 and to 75 inputs $a_1$ to $a_{75}$ of the selector 55 while those of the decoder 53 are connected to 75 other inputs $b_1$ to $b_{75}$ of the selector 54 and to 75 other inputs $b_1$ to $b_{75}$ of the selector 55.

As far as the flip-flops are concerned, the first, 56, has its clock input CL connected, through the intermediary of an invertor 59, to the input g of the circuit and hence to the output f of the frequency divider, its reset input R connected to output p of the selector 54 and its output Q connected to a third input a of the pulse-shaping circuit 8 while the second, 57, has its input CL connected directly to the input g, its input R connected to the output p of the selector 55 and its output Q connected to a fourth input, b, of the pulse-shaping circuit.

Finally, this pulse-shaping circuit has three outputs one of which, c, is connected to the first terminal of the coil 38, another, f, to the second terminal of this same coil and to the first terminal of the coil 39 and the last, g, to the second terminal of this coil 39.

If the circuit of FIG. 5, including the oscillator 1 and the frequency divider 2 but leaving aside the AND-gate 3, is compared with that found in French utility certificate application No. 86 00 743, where the same motor is also controlled by making its rotor effect one revolution per minute at a constant speed, it will be noted that they are entirely similar, that is they comprise the same elements connected together in the same way. The only differences are that the counter 50 has a counting capacity five times greater than that of the corresponding counter in the above application and that the number of decoder and selector inputs and/or outputs is not the same. This is due to the fact that in the French application the rotor of the motor is made to effect only 60 steps per revolution instead of 300.

On the other hand, the decoders 52 and 53 and the selectors 54 and 55 can be constructed in the same way as those described in detail in the French application simply by using gates and invertors but in greater numbers. The pulse-shaping circuit can be exactly the same.

Consequently, the detailed explanation of the functioning of the circuit of FIG. 5 can very easily be copied word-for-word from that of the circuit in the French utility certificate application, making the appropriate modifications to the values of the quantities linked to the number of steps per revolution of the rotor, while on the other hand leaving unchanged the values of the quantities linked to the fact that the rotor effects one revolution per minute. As, moreover, this explanation would be long and useless to the understanding of the invention, it will not be given. We will merely clarify three things.

Firstly, in the utility certificate application, the decoder corresponding to the decoder 52 is given a configuration such that fifteen numbers E are the integers nearest numbers F calculated by means of the relationship:

$$F = 64 \sin \frac{90° \times (2i - 1)}{15 \times 2}$$

these numbers E being equal to the different times T which separate each instant when all the outputs of the decoder go from the state "1" to the state "0" from the following instants when these outputs return successively to "1" divided by the half-period of the oscillator signal which is equal to approximately 15.2 μs.

In this relationship, the presence of the number 15 is connected with the fact that the number of stages which the quasi-sinusoidal voltages applied to the coils must have is 15 per quarter-period, this number also being the number of decoder outputs. The term 90° stems from the fact that it is obviously sufficient to determine the stage levels for just one of the voltages, in this case the sine voltage, and the first quarter period thereof. The term (2i-1)/2, where i is an integer which varies from 1 to 15, signifies that there is given to each stage level the value which the truly sinusoidal voltage corresponding to the instant situated in the middle of the period which defines this stage would have, which is another requirement to be respected if it is desired that the voltages applied to the coils be as close as possible to pure sinusoidal voltages. Finally, the number 64 is selected because it allows different values to be obtained for the numbers E.

In the case of the circuit of FIG. 5, the numbers F are preferably given by the relationship:

$$F = 128 \sin \frac{90° \times (2i - 1)}{75 \times 2}$$

The values of E are then as follows:

| i | E | i | E |
| --- | --- | --- | --- |
| 1 | 1 | 61 | 122 |
| 2 | 4 | 62 | 123 |
| 3 | 7 | 63 | 124 |
| 4 | 9 | 64 | 124 |
| 5 | 12 | 65 | 125 |
| 6 | 15 | 66 | 125 |
| 7 | 17 | 67 | 126 |
| 8 | 20 | 68 | 126 |
| 9 | 23 | 69 | 127 |
| 10 | 25 | 70 | 127 |
| 11 | 28 | 71 | 127 |
| 12 | 31 | 72 | 128 |
| 13 | 33 | 73 | 128 |
| 14 | 36 | 74 | 128 |
| 15 | 38 | 75 | 128 |

It may be noted that for the highest values of i E has the same value for several i's, that is to say that in the regions of the maximum and minimum of the voltage $V_1$ there will be stages where this voltage will preserve the same value no longer for merely a fifth of a second but for two, three or even four fifths of a second. However, it may also be noted that for the first values of i those of E are markedly different from each other, which means that during the time when the voltage $V_1$ remains the same the voltage $V_2$ will vary by stages of one fifth of a second and of markedly different levels. It is clear that the same will be true of the strengths of the magnetic fields $B_1$ and $B_2$ and the reverse will occur for the values of the voltage $V_2$ situated in the region of its maximum and minimum. Consequently, as has already been said, the fact that the voltages $V_1$ and $V_2$ do not have 75 different values per quarter-period is virtually without significance for the movement of the rotor.

If one wished actually to have 75 distinct stages it would be necessary to replace the number 128 in the expression of F with 2048, which would make the construction of the decoder much more complicated. It is obvious that nothing more than an increase in the number of steps per revolution of the rotor from 60 to 300 increases considerably the number of gates and inverters and, to an even greater extent, the number of transistors which are needed for making up the decoders and selectors.

It should be noted that this confirms what has previously been said with regard to the increase in the number of components which the control circuit of the motor must comprise in accordance with the number of steps per revolution of the rotor and that if it had been decided to make the second hand effect a much greater number of jumps per minute it would have been necessary to provide a reducing wheel-work between the motor and the second hand.

The second thing which needs clarifying is that, like that of the utility certificate application, the circuit of FIG. 5 allows the coils of the motor which it controls to be supplied with voltages which each vary between $+V_o$ and $-V_o$ (see FIG. 4), $V_o$ being equal to half the voltage of the battery fitted in the watch of which it is a part.

Finally, it should be noted that in the circuit of FIG. 5, the counters 50 and 51 each comprise reset inputs R which do not exist in the utility certificate application. These inputs R, which are both connected to the input i of the circuit, are provided to allow the rotor of the motor to be returned at any moment to the precise position in which the voltage $V_1$ is approximately zero and the voltage $V_2$ is equal to $+V_o$. Of course, it is arranged so that this position of the rotor corresponds to the zero position of the second hand which the rotor carries on its shaft.

Returning to FIG. 1, it should be noted that the output h of the frequency divider 2, at which output h the time pulses of 1/12 Hz appear, is connected via an AND- gate 9 and an OR-gate 10 to a circuit 11 serving to control a bidirectional stepping motor 12 which, through the intermediary of a wheel-work 13, drives a minute hand 7 and an hour hand 8.

Figure 6:
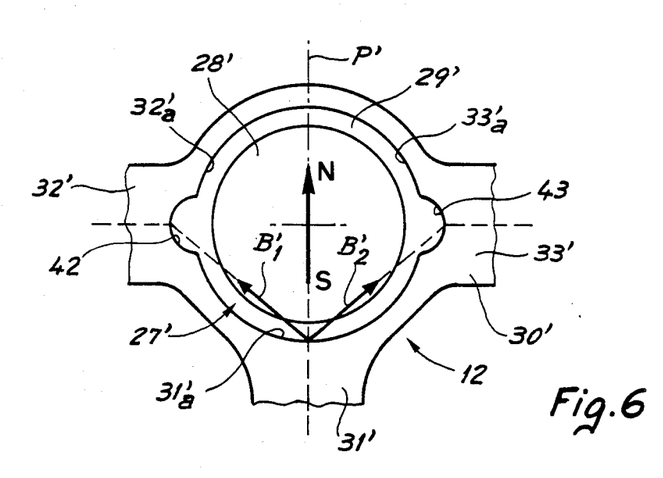
FIG. 6 is a partial diagrammatic view of the second motor of the watch, which motor drives the other hands.

This second motor 12, which is shown partially in FIG. 6, is virtually identical to the motor 5. The only difference is that the pole faces $32'_a$ and $33'_a$ of the pole parts 32' and 33' of the stator 30', which correspond to the pole parts 32 and 33 of the stator of the motor 5, contain notches 42 and 43 respectively, these being symmetrical with respect to the plane P' which is the equivalent of the plane of symmetry P of the motor 5 (see FIG. 2). These notches are one of several methods of constructing the additional positioning means which have already been discussed and which allow the rotor 27' to be provided with two well-defined, stable rest positions in which its magnetization axis N-S is situated in the plane P'. They could be replaced, for example, by flat parts approximately perpendicular to the plane P' and which would be presented by the pole face $31'_a$ of the other pole part 31' of the stator and the inner face of the narrow part diametrically opposite thereto with respect to the opening 29 in which the rotor magnet 28' is located.

There are four different ways of supplying the two coils of a bidirectional motor such as the motor 12 to make it function normally, that is by steps of 180° in one sense or the other.

The first method consists in applying at the same time a drive pulse of predetermined duration and polarity to one of the coils and two successive shorter pulses to the other, the first of these shorter pulses being of the same polarity as the long pulse and the second being of the opposite polarity. In this way the resultant of the fields $B'_1$ and $B'_2$ created by the coils, which have the same strength, can be caused to rotate in one sense or the other and thus to drive the rotor in the same sense.

The second method consists in sending a pulse to one of the coils, then immediately thereafter a pulse of the opposite polarity to the other coil. In this case the fields $B'_1$ and $B'_2$ act successively on the rotor to cause it to effect a step.

The third method has in common with the first the fact that there are applied to one of the coils two short pulses of opposite polarities and to the other coil one longer pulse which finishes at the same time as the second short pulse. It differs in that the two short pulses are separated by a certain time lapse approximately equal to their duration, that the long pulse only begins when the first short pulse ends and that this long pulse and this first short pulse have opposite polarities. Thus, here one of the fields B'$_1$ and B'$_2$ is used, then the other, then the resultant of the two.

Finally, the fourth possiblity consists in using one coil to make the rotor turn in one sense and the other coil to drive the rotor in the other sense and in simply applying to them drive pulses of alternating polarity, at a rate of one pulse per step.

The first of these four possible ways of making the motor operate is described in detail in U.S. Pat. No. 4,371,821, while the other three are described in detail in U.S. Pat. No. 4,514,676. It is not therefore necessary to do so here.

Furthermore, it is obvious that any one of these methods can be used in the construction of the watch of FIG. 1, although the first is preferable as it has up to now proved the most advantageous, and that the way in which the control circuit 11 is designed depends on which is chosen. This is one of the reasons why the circuit 11 will not be described in detail either. The other reason is that, depending on whether one opts for the first method or one of the three others, it is possible to use practically without modification either the circuit which is already found in certain watches which comprise a bidirectional motor similar to the one in FIG. 6, or one of the circuits described in the above-mentioned U.S. Pat. No. 4,514,676.

The only thing which needs clarifying for it to be possible to explain the functioning of the watch shown in FIG. 1 is that, in addition to the time pulses at 1/12 Hz or, as will be seen below, the correction pulses which are applied to one, a, of its inputs and various periodic signals originating from the frequency divider 2, the circuit 11 also receives, at one input b, a rotational direction control signal CS which allows it to make the motor 12 turn in one direction or the other according to the logic level of this signal.

This signal CS is produced by a correction system comprising a manual rotary control stem with two axial positions, one neutral and the other a correction position. When this stem, which is not shown in FIG. 1, rotates it actuates two switches 14 and 15 which then generate two signals each formed by a succession of pulses whose frequency is proportional to the speed of rotation of the stem and which are out of phase one with the other, the sign of phase difference depending on the sense of this rotation. These signals are transmitted via anti-bouncing circuits 17 and 18 to the inputs a and b of a correction signal generator circuit 20.

A third switch 16, actuated by the control stem when it is displaced axially, supplies a logic signal representing the position occupied by this stem which is applied through the intermediary of an anti-bouncing circuit 19 to a third input c of the correction signal generator circuit 20 and to the input i of the control circuit 4 of the first motor 5. This signal, which has the value "0" or the value "1" depending on whether the stem is in the neutral position or the correction position respectively, is also sent to the input of an inverter 21 whose output is connected to the input R of the frequency divider 2 and to the AND-gates 3 and 9.

The correction signal generator circuit 20, which can be very easily constructed with the aid of flip-flops and gates in the manner of the one described in U.S. Pat. No. 4,379,642, is designed to produce, in addition to the rotational direction control signal CS of the second motor which it delivers at a first output d, a correction pulse signal CP which it supplies at a second output e connected to the OR-gate 10.

The signal CS remains at the same logic level, for example "0", except when the control stem is both in the correction position and being made to rotate in the sense provided for putting the watch back.

As for the correction pulses CP, these appear at the output e of the circuit each time the stem is turned in the correction position and their frequency, like that of the signals produced by the switches 14 and 15, is proportional to the speed at which this stem is rotated.

Taken as a whole, the watch which has just been described operates in the following manner.

During normal operation the control stem is in the neutral position and the signal supplied by the switch 16 is at logic level "0". The AND-gates 3 and 9 are therefore open, respectively, to the signal at 5 Hz and the time pulses at 1/12 Hz produced by the frequency divider 2. The control circuit 4 in this case receives at its inputs the signal at 5 Hz, the signals originating from the outputs a to f of the divider and the signal of the oscillator 1 and it continuously applies to the coils of the first motor the two quasi-sinusoidal voltages $V_1$ and $V_2$ which enable the rotor of the first motor to effect a step of 1.2° every fifth of a second and to make the second hand 6 move forward in the same way. At the same time the control circuit 11 applies drive pulses every five seconds to the second motor 12 and as the rotational direction control signal CS is at level "0" the rotor of this motor rotates by steps of 180° in the sense which allows the minute hand 7 and the hour hand 8 to be caused to move forward. Of course, the control of the two motors is synchronized so that the jumps made by the minute hand take place when the second hand passes through its zero position.

When the stem is put into the correction position the logic signal supplied by the switch 16 goes to the level "1", which results in the blocking of the AND-gates 3 and 9 and in the counters 50 and 51 of the control circuit 4 of the first motor (see FIG. 5) being put to zero. As a result of this setting to zero of the counters, and although the control circuit 4 continues to receive at its inputs a to g the signals from the oscillator and the divider, the second hand, at this point moves via the shortest path into its zero position and, given that the counter 50 is no longer receiving the signal at 5 Hz, it remains there as long as the stem is in the correction position.

Moreover, from the moment when the stem is in this position and as long as it is not being made to rotate, the minute and hour hands no longer move forward, in view of the fact that the pulses at 1/12 Hz are no longer being received by the control circuit 11 of the second motor. On the other hand, if the stem is rotated correction pulses CP are produced by the correction signal generating circuit 20 and applied via the OR-gate 10 to the circuit 11. When the stem is rotated in one direction the signal CS remains at logic level "0" and the circuit 11 applies to the motor 12 drive pulses which make its rotor turn in the direction which allows the minute and hour hands to be moved forwards. When the stem is rotated in the other direction, the signal CS goes to logic level "1" while the correction pulses CP are being produced and the circuit 11 controls the motor 12 in such a way that it drives the hands in the backwards direction.

Finally, when the stem is brought back into the neutral position the logic signal supplied by the switch 16 goes from level "1" to level "0", which results in all the outputs of the frequency divider 2 being reset to zero. This allows in particular the inputs b to g of the decoder 52 of the control circuit 4 of the first motor also to be reset to zero, and as the gates 3 and 9 once again become passable the watch returns to normal operation.

Figure 7:
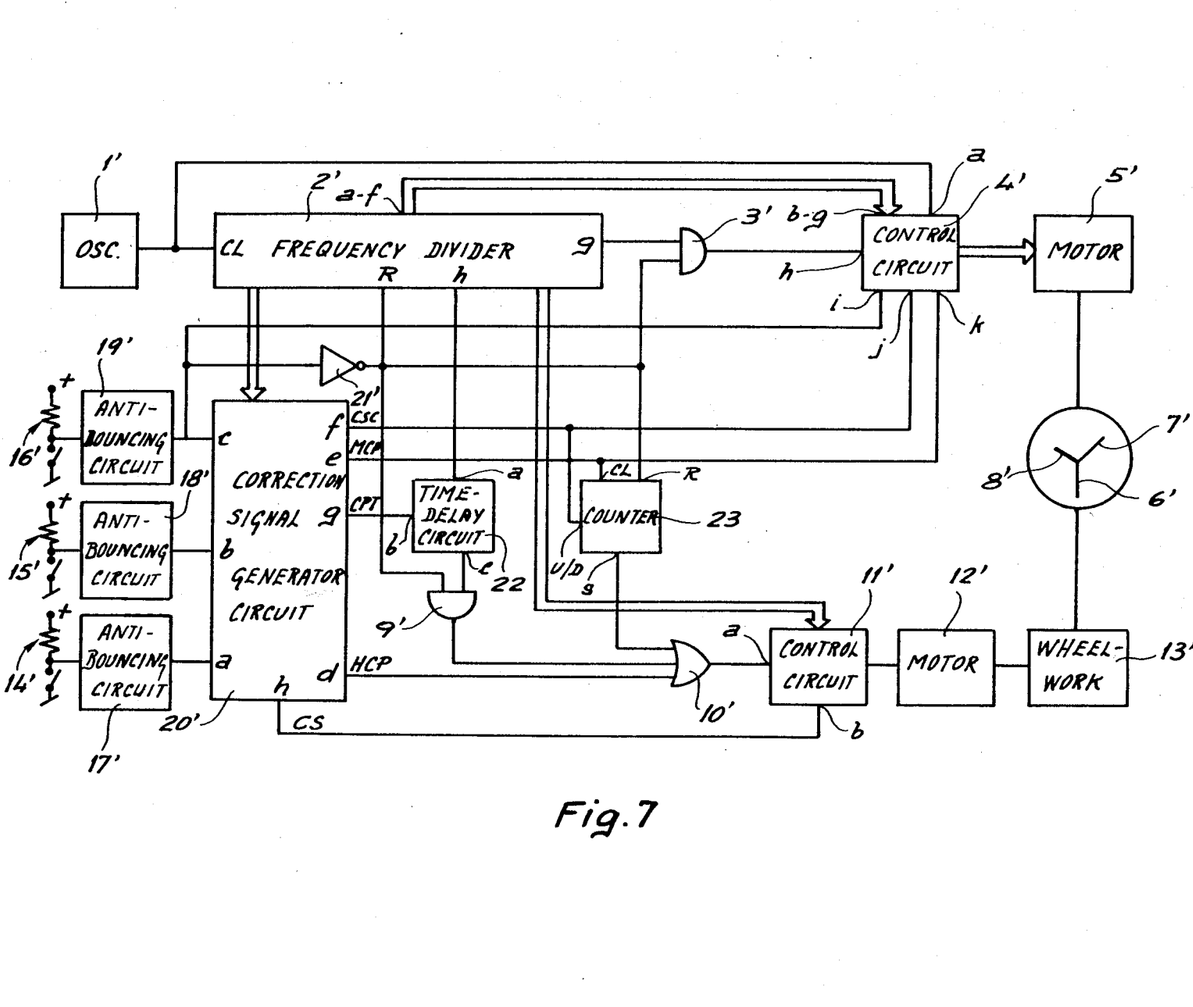
FIG. 7 is a block diagram of another electronic watch according to the invention with two motors, in which the first motor drives both a second hand and a minute hand.

The watch shown in FIG. 7 belongs to the category of those which comprise a first motor to turn both a second hand and a minute hand and a second to drive only an hour hand and which enable the user to put the watch right, that is to say to modify the minute indication together with that of the hours and to effect an alteration of the time zone by moving only the hour hand.

As before, this watch comprises an oscillator 1' which produces a signal at 32 768 Hz and a frequency divider 2' with an input CL connected to the oscillator, a reset input R, seven outputs a to f and g through which it supplies periodic signals at 16 384 Hz, 8 192 Hz, 4 096 Hz, 2 048 Hz, 1 024 Hz, 512 Hz and 5 Hz respectively and an output h where time pulses appear whose period is no longer 5 seconds but five minutes.

Here also, the output g of the frequency divider 2' is connected through the intermediary of an AND-gate 3' to an input h of the control circuit 4' of the first motor 5', which is identical to the motor of FIG. 2 and which drives the second hand 6' mounted directly on the shaft of its rotor and the minute hand 7' through the intermediary of a wheel-work (not shown).

Figure 8:
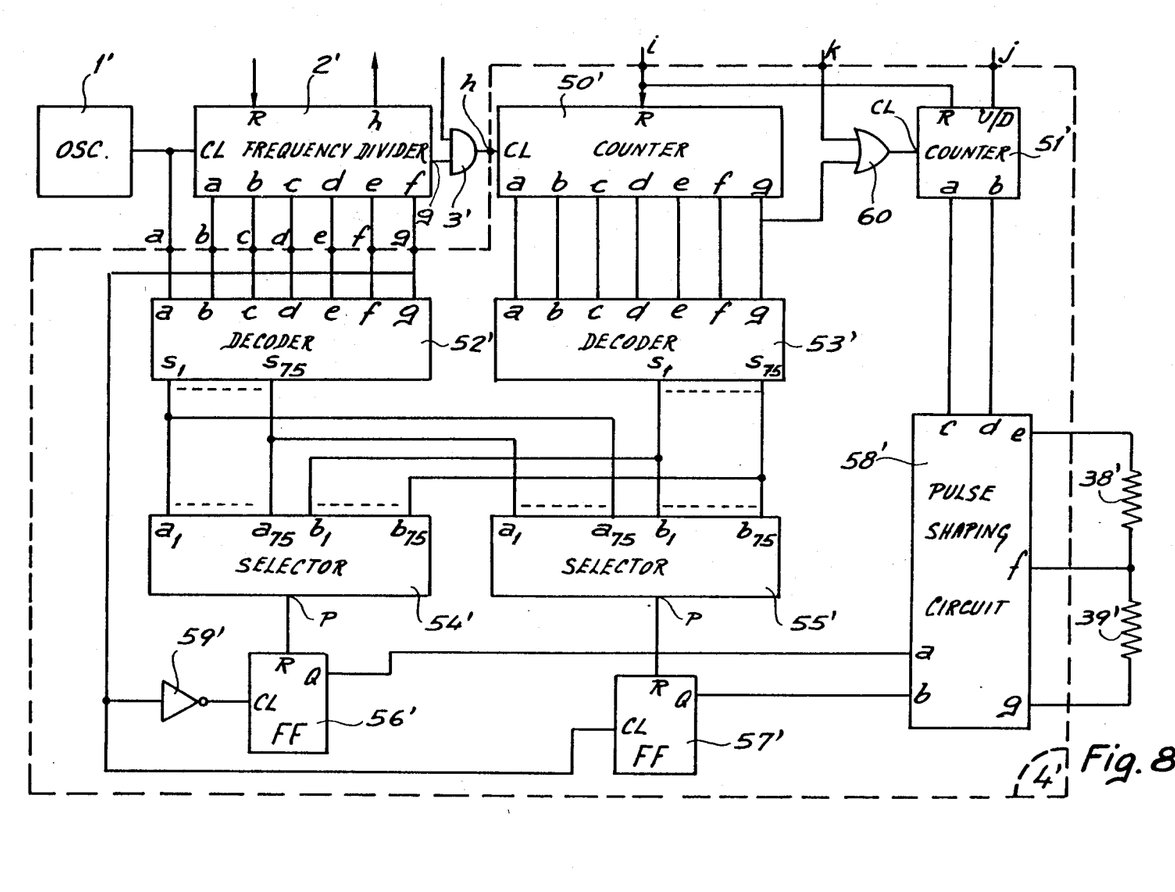
FIG. 8 is a block diagram of the control circuit of this first motor.

The control circuit 4' which is shown in FIG. 8 and which receives at other inputs a, b to g and i, respectively the oscillator signal, the signals originating from the outputs a to f of the divider and a logic signal, comprises a divide-by-75 counter 50', two decoders 52' and 53', two selectors 54' and 55', two flip-flops 56' and 57', an invertor 59' and a pulse-shaping circuit 58' identical to those of the circuit of FIG. 5 and connected together, to the input terminals a to i of the circuit and to the two coils 38' and 39' of the first motor in exactly the same way. Moreover, the circuit 4' also comprises a divide-by-4 counter 51' with a reset input connected to the input i and two outputs a and b connected to the pulse-shaping circuit, but in this case the counter is bidirectional with a counting direction control input U/D connected to another input j of the circuit and has its clock input CL connected no longer directly to the output of greatest load g of the divide-by-75 counter but through the intermediary of an OR-gate 60 otherwise connected to a last input k of the circuit.

Returning to FIG. 7, it can be seen that the output h of the frequency divider where the time pulses at 1/300 Hz appear is connected to an input a of a circuit 22 whose output c is connected via an AND-gate 9' and an OR-gate 10' to an input a of the control circuit 11' of the second motor 12' which is identical to the motor 11 of the watch of FIG. 1 and which drives the hour hand 8' by means of a wheel-work 13'.

For the same reasons for which the control circuit 11 of FIG. 1 was not described in detail, the circuit 11' will not be described in detail either.

The role of the circuit 22, which has a further input b intended to receive a logic signal, will be described below.

The watch of FIG. 7 also comprises three switches 14', 15' and 16' which are actuated by a rotary control stem with two positions and connected by anti-bouncing circuits 17', 18' and 19' to three inputs a, b and c of a correction signal generator circuit 20' in the same way as before.

Moreover, like the one which formed the subject matter of U.S. Pat. No. 4,398,831, it is designed to be put to the right time by turning the control stem at any speed when this stem is in the position which we shall continue to call the "correction position" and to allow an alteration of the time zone by leaving this stem in the position which will continue to be called "neutral" and subjecting it to a particular rotary movement which may consist, for example, in turning it by an angle greater than or equal to a predetermined minimum angle in a time interval shorter than a similarly predetermined time.

Each time the stem is subjected to this particular movement in the neutral position the circuit 20', the design of which can be very easily deduced from that of the corresponding circuit in U.S. Pat. No. 4,398,831, produces a train of twelve correction pulses HCP, at a fixed, relatively high frequency, for example 32 Hz, which appear at an output d connected to the OR-gate 10'.

On the other hand, when the stem is turned in the correction position the circuit 20' generates pulses of a frequency proportional to the speed of rotation of the stem from signals originating from the switches 14' and 15', and as these pulses are produced it transforms each one into a train of four correction pulses MCP the frequency of which is fixed and may be equal to that of the pulses HCP and which are emitted by an output e of the circuit, which output e is connected, on the one hand, to the input k of the control circuit 4' of the first motor and, on the other hand, to the input CL of a reversible divide-by-20 counter 23 whose output s is connected to the OR-gate 10'.

To these two types of correction pulses which the circuit 20' is charged with producing, there are added three logic signals CS, CSC and CPT, which the circuit 20' supplies at three other outputs, h, f and 9 respectively.

The first of these signals, CS, is applied to another input b of the circuit 11' and serves to control the sense of rotation of the second motor 12'. It always remains at the same logic level, for example "0", except during the time when a train of pulses HCP or MCP is supplied by the circuit and provided that this train is produced in response to a rotation of the stem in the sense which allows the watch to be put back.

The second signal, CSC, is provided to control the counting sense of the divide-by-4 counter 51' of the control circuit 4' of the first motor and that of the divide-by-20 counter 23. It is therefore applied to an input j of the circuit 4' and an input U/D of the counter 23 and is assumed to remain at level "0" except during the time when a train of pulses MCP is produced in response to a rotation of the stem in the sense which allows the hands to be moved backwards.

As for the last signal, CPT, this is the one which is applied to the input b of the circuit 22. It remains, for example, at level "1" except during the periods when trains of pulses HCP are generated by the circuit 20', irrespective of the sense in which the stem has been turned.

If the circuit 22 receives a time pulse from the frequency divider while the signal CPT is at "0" it has to memorize it in order to be able subsequently to restore it, immediately after this signal has returned to "1". In contrast, as long as the signal CPT is at "1" this same circuit, one possible embodiment of which can be found in U.S. Pat. No. 4,398,831, has to content itself with transmitting immediately the time pulses originating from the divider to the AND-gate 9'.

It should be noted that, in view of the time needed for the formation of a train of twelve pulses at 32 Hz, only one time pulse can be produced at that moment.

Finally, to be able to explain briefly the operation of this second watch chosen by way of example it is necessary further to specify that the output of the anti-bouncing circuit 19' associated with the switch 16' is connected directly to the input i of the control circuit 4' of the first motor and, through the intermediary of an inverter 21', to the reset input R of the frequency divider, to the two AND-gates 3' and 9' and to a reset input R of the divide-by-20 counter 23.

During normal operation, that is to say when the stem is in the neutral position and not being subjected to the particular rotary motion which allows correction of the hour indication only, the AND-gate 3' transmits the signal originating from the output g of the divider to the control circuit 4' and, as the signal CSC is then at level "0", the contents of the divide-by-4 counter 51' (see FIG. 8) are always incremented by the signal originating from the output g of the counter 50', which means that this circuit operates in exactly the same way as in the case of the watch of FIG. 1. The first motor thus makes the second hand move forward, at a rate of five jumps per second, as well as the minute hand, whose jumps are too small to be perceptible.

Furthermore, as the signal at the output of the inverter 21' and the signal CPT are then both at level "1" the time pulses are transmitted to the control circuit 11' as soon as they appear at the output h of the frequency divider and, in view of the fact that the signal CS is at "0", this circuit generates drive pulses which allow the second motor to move the hour hand forward at a rate of one jump every five minutes, the jumps occurring when the minute hand is opposite an hour mark on the dial and the second hand passes through its zero position.

If, leaving the stem in its neutral position, it is subjected to the particular rotary motion mentioned above, the correction signal generator circuit 20' sends a train of twelve pulses HCP to the control circuit 11' of the second motor, which pulses cause rapid displacement of the hour hand. When the stem is rotated in one sense the rotational direction control signal CS remains at level "0" and the hand moves forwards. When the stem is rotated in the other sense, the signal CS goes to level "1" while the pulse train is being produced and the hand moves backwards. In both cases the signal CPT goes to level "0" and remains there for the entire duration of the pulse train and if a time pulse appears at the output of the divider the time-delay circuit 22 memorizes it in order subsequently to restore it, the watch therefore always being put forward or back by exactly an hour.

Of course, to modify the display by several whole hours it suffices to repeat the same movement several times.

Moreover, it is clear that while this type of correction is being undertaken the second and minute hands continue to move forward normally, the signal CSC remaining at "0" and the AND-gate 3' remaining open to the signal which it receives from the divider.

When the stem is moved into the correction position the logic signal supplied by the switch 16' goes to state "1", which results in the blocking of the AND-gates 3' and 9' and in the resetting of the counters 50' and 51' of the control circuit 4'. The rotor of the first motor then moves into the position corresponding to the zero position of the second hand, which causes a slight displacement of the minute hand which moves into alignment with the minute mark to which it was nearest. The three hands then remain immobile as long as the stem is not touched.

If it is turned, the correction signal generator circuit 20' produces one or more trains of four pulses MCP which is or are sent to the input CL of the counter 51' via the OR-gate 60 (see FIG. 8) and to the input CL of the divide-by-20 counter 23.

If the stem is rotated in the direction in which the signal CSC remains at "0" the pulses of this or each of these trains increment the contents of the counter 51' so as finally to reset it to zero. When it is known how the circuit 4' and the motor 5' function, it can be deduced therefrom that the second hand will then make four rapid, successive jumps of a quarter of a revolution in the sense in which it usually turns to return to the zero position which it occupied initially, and consequently that the minute hand will move forward by one minute.

If the reverse is the case, i.e. if the signal CSC goes to "1" when a train of pulses is applied to the counter 51, the contents of this latter are reduced, which causes the second and minute hands to effect the same movement but in the reverse direction.

If the correction to be made before the stem is returned to its neutral position is of less than five minutes, the counter 23, which also counts or deducts the pulses MCP, does not emit any pulse and the position of the hour hand is not modified. If, on the other hand, the correction exceeds five minutes, the counter 23 produces one pulse each time that, having already counted 19 pulses MCP which have allowed the second and minute hands to be turned in the same direction, it receives a twentieth. If the correction consisted in moving the minute hand forward, the signal CS is at level "0" when this pulse from the counter 23 is applied to the control circuit 11'. The motor 12' thus causes the hour hand to move forward by one step. If the reverse is the case, the signal CS is still at "1" when the pulse is sent to the circuit 11', which causes the hour hand to move backwards by one step.

Finally, it is clearly not necessary to have turned the stem in the correction position for all the outputs of the frequency divider to be set to zero, the AND-gates 3' and 9' to become passable again and, consequently, for the watch to return to normal operation when the stem is returned to the neutral position. However, if the watch has actually been put to the right time the return of the stem to its neutral position also ensures the resetting to zero of the counter 23.

Obviously, a watch, and more generally a timepiece, according to the invention can come in a multitude of forms.

On the basis merely of the two which have just been described, and leaving aside all the manual and non-manual control means which can be used, all the possible ways of using them and all the correction circuits which could be associated with them, it is possible to imagine many others.

For example, if for reasons of energy-consumption or otherwise the number of jumps per revolution effected by the minute hand or the hour hand in these watches proves too great, it could very easily be reduced, at a pinch even to as few as 60.

Conversely, the number of jumps effected per second by the second hand could be increased to 16 or 32 so that the wearer has the impression of truly continuous movement, although as has already been implied, it might be necessary to provide a wheel-work between the motor and the hand.

It might also be possible to construct the watch circuit, and in particular, the control circuit of the first motor, in such a way that the second hand does not return automatically to zero when the watch is being set right but only on command, or even in such a way that it does not return to zero at all. In the case of the watch of FIG. 1 it could retain the position which it occupied before the stem was moved into the correction position until the stem is returned to the neutral position. In the case of the watch of FIG. 7, the second hand is obliged to turn if it is wished to displace the minute hand but it could do so from the position it occupied before the stem was moved into the correction position so as to return subsequently to this same position or to the position desired by the wearer.

Moreover, the motor chosen as first motor is that which forms the subject matter of U.S. Pat. No. 4,371,821 because it exhibits many advantages, in particular that of having already been used in almost the same form in watches. Clearly, however, it could be replaced by another. Any motor with at least two coils, which could be controlled so as to cause its rotor to effect the desired number of steps per revolution at a suitable speed and so as to make the rotor occupy a predetermined position, would be equally suitable, provided of course that it had the necessary qualities, especially with regard to cost, size and consumption, to be incorporated into a timepiece.

The same is true of the second motor, which could be replaced by another bidirectional stepping motor, for example the one with a single coil which forms the subject matter of U.S. Pat. No. 4,460,859, or even by a conventional uni-directional motor of the Lavet type. The disadvantage of a motor which functions in only one direction is that it does not allow corrections to be made as quickly as a motor turning in both directions. On the other hand, its control circuit can be considerably simpler.

Furthermore, the fact that we have emphasized the advantage to be had in choosing an embodiment of the motor from the American Patent which does not comprise additional positioning means for the rotor should not lead the reader to think that the first motor must not comprise such means or any positioning means at all. For example, in the case of a watch designed to give the user the possibility of interrupting the supply of the motor driving the second hand or of the two motors, especially at night or for relatively long periods when he is not wearing it, such means can be useful and the increase in consumption due to their presence is compensated by the fact that the motor or motors do not function continuously.

Another possible design based on the two watches which have been described is one which would consist in making them fulfil functions other than that simply of indicating the time. The watch of FIG. 1 is particularly suited to the addition of an "alarm" function, the hour and minute hands being capable of being used to memorize and display on command one or more alarm times. That of FIG. 7 is better suited to fulfilling a chronographic function. On the other hand, both could additionally comprise display mechanisms and members driven by the second motor to indicate the date.

Finally, it should be remembered that the invention is not restricted to timepieces with two motors. They could comprise more. Generally speaking, the invention is applicable, with a great likelihood of advantage, to any timepiece with analog display which serves to indicate the time and which comprises at least two motors one of which drives at least a second indicator member.

I claim:

1. An electronic timepiece with analog display comprising
an oscillator;
a frequency divider connected to said oscillator;
a first indicator member for displaying the seconds and a second indicator member for displaying other time information;
a first motor comprising a rotor with a permanent magnet carried by a shaft drivingly coupled to the first indicator member and at least two coils;
a first control circuit connected to the frequency divider to control the first motor, which is operative to apply continuously to said coils variable voltages whereby the rotor of this first motor is subjected to a magnetic field rotating such that the first indicator member moves forward by at least five jumps per second, so long as the timepiece is in a normal functioning mode;
a second motor which functions step-by-step in response to voltage drive pulses so as to drive the second indicator member;
a second control circuit also connected to the frequency divider to produce the said voltage drive pulses and apply them to the second motor; and
a correction device for changing the timepiece from said normal functioning mode to a correction mode and vice versa and for modifying at least the time information displayed by the second indicator member when the timepiece is in the correction mode;

2. A timepiece according to claim 1, wherein the second indicator member displays the minutes and comprising a third indicator member for displaying the hours which is also driven by the second motor.

3. A timepiece according to claim i, wherein the second indicator member displays the hours and comprising a third indicator member for displaying the minutes which is also driven by the first motor.

4. A timepiece according to claim 1, wherein the first indicator member is fixed directly to the shaft of the rotor of the first motor.

5. A timepiece according to claim 4, wherein the first control circuit and the correction device are designed for moving the first indicator member automatically into the position in which it displays zero when the timepiece goes from the normal functioning mode to the correction mode.

6. A timepiece according to claim i, wherein the first motor comprises a stator with three pole parts which at least partially surround the magnet of the rotor and which each have a pole face in the form of a cylinder portion centred on the axis of rotation of the rotor facing the said magnet, the pole parts being arranged such that first and second of them are symmetrical with respect to a plane containing the axis of rotation of said rotor and constituting the median plane of the third pole part, the stator further comprising another part which connects the pole parts together on the side opposite their pole faces and around which are positioned two coils, each coil being located between a respective one of said first and second pole parts and said third pole part; and wherein the said magnet is bipolar and has an axis of magnetization approximately perpendicular to the axis of rotation of the rotor, which causes said rotor to be subjected to a positioning torque which tends continuously to make it occupy one or other of two opposed positions in which said axis of magnetization of the magnet is approximately in said plane.

7. A timepiece according to claim 6, wherein the voltages applied to the coils in the normal functioning mode of the first motor both vary in stages, following respective sinusoidal curves of the same period and amplitude, out of phase one with the other by a quarter of a period.

8. A timepiece according to claim 6, wherein the second motor is identical to the first except in that it further comprises additional positioning means to increase the strength of said positioning torque.

9. A timepiece according to claim 8, wherein the additional positioning means of the second motor comprise two notches each in a respective one of said first and second pole parts of the stator, on their pole face sides.

* * * * *

UNITED STATES PATENT AND TRADEMARK OFFICE
CERTIFICATE OF CORRECTION

PATENT NO. : 4,684,262
DATED : August 4, 1987
INVENTOR(S) : Pierre-Andre Meister It is certified that error appears in the above-identified patent and that said Letters Patent are hereby corrected as shown below:

In Claim 3, line 1, change "i" to --1--.

In Claim 6, line 1, change "i" to --1--.

Signed and Sealed this

Eighth Day of December, 1987

*Attest:*

DONALD J. QUIGG

*Attesting Officer*  *Commissioner of Patents and Trademarks*